(12) United States Patent
Underwood et al.

(10) Patent No.: US 11,817,605 B2
(45) Date of Patent: Nov. 14, 2023

(54) FLOW BATTERY

(71) Applicant: INVINITY ENERGY SYSTEMS (IRELAND) LIMITED, Dublin (IE)

(72) Inventors: Richard Underwood, Dublin (IE); Adam Whitehead, Dublin (IE); Peter Ridley, Dublin (IE)

(73) Assignee: INVINITY ENERGY SYSTEMS (IRELAND) LIMITED, Dublin (IE)

(*) Notice: Subject to any disclaimer, the term of this patent is extended or adjusted under 35 U.S.C. 154(b) by 306 days.

(21) Appl. No.: 17/265,537

(22) PCT Filed: Aug. 8, 2019

(86) PCT No.: PCT/EP2019/071372
§ 371 (c)(1),
(2) Date: Feb. 3, 2021

(87) PCT Pub. No.: WO2020/030762
PCT Pub. Date: Feb. 13, 2020

(65) Prior Publication Data
US 2021/0226239 A1 Jul. 22, 2021

(30) Foreign Application Priority Data

Aug. 8, 2018 (GB) ...................................... 1812888

(51) Int. Cl.
*H01M 8/04992* (2016.01)
*H01M 8/04186* (2016.01)
(Continued)

(52) U.S. Cl.
CPC ... *H01M 8/04992* (2013.01); *H01M 8/04186* (2013.01); *H01M 8/04477* (2013.01);
(Continued)

(58) Field of Classification Search
CPC ......... H01M 8/04186; H01M 8/04477; H01M 8/04858; H01M 8/04992; H01M 8/188; H01M 8/2455; H01M 8/249
See application file for complete search history.

(56) References Cited

FOREIGN PATENT DOCUMENTS

| CN | 102460810 | * | 5/2012 |
| CN | 102460810 A | | 5/2012 |

(Continued)

OTHER PUBLICATIONS

Int'l. Search Report for PCT/EP2019/071372, dated Apr. 12, 2019.

*Primary Examiner* — Brittany L Raymond
(74) *Attorney, Agent, or Firm* — MaxGoLaw PLLC

(57) ABSTRACT

The balancing of the state of charge of a plurality of flow battery electrolytes is better achieved by a method for a battery having a plurality of flow battery stacks in series and supplied with electrolytes from at least two stores, in which the stacks each having a plurality of cells, the method including measuring and comparing the state of charge of the electrolytes of the respective stores and registering if the states of charge differ by more than a threshold and in the case of the state of the charge difference threshold being exceeded: controlling the number of cells in the series connection of the stacks whereby the less charged electrolytes discharge through fewer cells than the more charged electrolytes and/or controlling the number of cells in the series connection of the stacks whereby the less charged electrolytes are charged through more cells than the more charged electrolytes.

20 Claims, 4 Drawing Sheets

(51) Int. Cl.
*H01M 8/0444* (2016.01)
*H01M 8/04858* (2016.01)
*H01M 8/18* (2006.01)
*H01M 8/2455* (2016.01)
*H01M 8/249* (2016.01)

(52) U.S. Cl.
CPC ....... *H01M 8/04858* (2013.01); *H01M 8/188* (2013.01); *H01M 8/249* (2013.01); *H01M 8/2455* (2013.01)

(56) References Cited

FOREIGN PATENT DOCUMENTS

WO 1997049158 A1 12/1997
WO WO 97/49158 * 12/1997

* cited by examiner

FLOW BATTERY

The present invention relates to flow battery including a plurality of flow battery stacks, in particular Vanadiun Redox flow battery stacks.

A Vanadium Redox battery stack is described in our International Application No WO03069692, whose abstract is as follows and the first part only need be referred to for understanding of the present invention:

A redox flow battery 1 has a stack of individual cells, shown diagrammatically as a single cell 1, with anolyte and catholyte compartments 2,3 divided from each other by an ionically selective and conductive separator 4 and having respective electrodes 4,5. The battery has anolyte and catholyte tanks 6,7, with respective pumps 8,9 and a pipework 10,11. In use, the pumps circulate the electrolytes An,Ca to and from the tanks 8,9, to the compartments 2,3 and back to the tanks. Electricity flows to a load L. The electrolyte lines are provided with tappings 21,22 via which fresh electrolyte F can be with added and further tappings 23,24 via which spent electrolyte S can be withdrawn, the respective tappings being for anolyte and catholyte. On recharging, typically via a coupling 25 for lines 26 to all the tappings, a remote pump 27 pumps fresh anolyte and fresh catholyte from remote storages 28 and draws spent electrolyte to other remote storages 29. This electrolyte is, typically by a conventional fuel cell recharging method, recharged and passed back to the storages 28.

In the above abstract replacement of electrolyte is referred to. It is more normal to recharge by current reversal, as is normal with rechargeable batteries.

Often such batteries having a stack of cells are connected in series. Some of the stacks, but not all, can be supplied with electrolyte from common tanks Where for instance, four stacks are in series they can be supplied with electrolyte from two pairs of tanks Due to the build-up of tolerances, which can lead to electrolyte overflow of +ve electrolyte into the –ve electrolyte tank and vice versa, itself aggravating the situation, the electrolytes can discharge at different rates, in other words the respective States Of Charge (SOC) of the electrolytes can be out of balance. This in turn can lead to a significant loss of capacity as the more charged electrolytes can discharge only until the less charged electrolytes are discharged and these can recharge only until the more charged electrolytes are fully charged.

Solutions to this problem have been proposed as in WO/2018032409, which proposes that separate power conversion systems, connected to groups of or individual stacks, can be used to modulate individually the power to and from the tank pairs, thereby balancing the SOC among the electrolytes. This is an expensive solution to a problem that may not be present with all battery stacks.

The object of the present invention is to provide an improved method of balancing the state of charge of a plurality of flow batteries electrolytes A method of balancing the state of charge of a electrolytes in a battery having a plurality of flow battery stacks in series and supplied with electrolytes from at least two stores, the stacks each having a plurality of cells, the method consisting in the steps of:

measuring and comparing the state of charge of the electrolytes of the respective stores and registering if the states of charge differ by more than a threshold and in the case of the state of the charge difference threshold being exceeded:

controlling the number of cells in the series connection of the stacks whereby the less charged electrolytes discharge through fewer cells than the more charged electrolytes and/or controlling the number of cells in the series connection of the stacks whereby the less charged electrolytes are charged through more cells than the more charged electrolytes.

The number of cells in series can be controlled by making connection to an intermediate electrode within a stack and leaving a number of the cells in the stack unconnected. However, preferably one or more entire stacks is switched in or out of series.

Control of the number of cells connected in series can in practice normally be done only by switching cells out of series; the alternative of switching in additional cells supplied by other electrolyte normally being impractical. Thus, when discharging, the less charged electrolyte is supplied to a reduced number of cells thus making less demand on it than the more charged electrolyte; and, when charging, the more charged electrolyte is supplied to less cells, which involves switching cells out from charging it, so that the less charged electrolyte receives more charge than the more charged electrolyte.

Whilst it can be envisaged that the switching in and out of cells, as a complete stack or as a proportion of the cells in the stack, could be by transistor switches, it is preferably by physical switches. Normally there will be two switches, one for connecting the normal battery terminal to a load line and the other for connecting a temporary (fewer cells) terminal to the load line. Preferably they will be ganged together, whereby they cannot both be closed at the same time. The corollary is that at an intermediate position in the process of switching, they are likely to be both be open at the same time. To avoid this causing an interruption of power supply to or indeed charging from the load line, each switch is preferably provided with a respective unidirectional conduction element, conveniently a diode, arranged to allow charging/discharging current flow from the temporary terminal and to the normal terminal, when both switches are open.

According to another aspect of the invention there is provided a flow battery comprising:

a series array of at least two stacks of cells having at least two respective electrolyte stores;

means for measuring and comparing the state of charge of the electrolytes in the respective stores;

switch means for switching a bypass shunt into the series array in place of at least some by-passed ones of the cells or stack(s) of cells, this by-pass switch means being normally open;

switch means for switching out the by-passed ones of the cells or stack(s) of cells from the series array, this switch-out switch means being normally closed; and a controller for actuating the switches in event of the measuring and comparing means detecting a difference above a threshold in state of charge in the respective stores, whereby during charging and/or discharging the state of difference can be reduced.

Preferably the measuring means is a respective reference cell associated with each electrolyte store. Alternatively the reference cell could be associated with one or more of the stacks connected to the electrolyte stores. Again the state of charge can b measured in the manner described in WO9003666.

Preferably, the switch means for switching out is connected to the by-passed cells at one end of their series connection together.

Preferably, the bypass switch means is connected in a shunt line across the said by-passed ones of the cells or stack(s) of cells.

The switch means could comprise transistor switches. However, we prefer to use electromagnetic relays.

The switching out switches could be duplicated at either side of the cells/stack(s) to be switched out, but are preferably provided at one side only, this being effective to remove them from being active in the battery.

In order to avoid an interruption of supply or indeed charging when the switches are made, each preferably has a diode in parallel with it, whereby opening of a first switch is followed by immediate conduction through the diode of another switch prior to closure of this switch.

Preferably, the bypass diodes, that is the diodes in parallel with the switches in the bypass shunts, are oriented to conduct current during discharge, to facilitate continuous discharge when the cells/stack(s) being switched out are no longer in the array; and the diodes in parallel with the switching out switches are oriented to conduct current during charging, to facilitate continuous charging as switched out cells/stack(s) are switched back into the array.

In one embodiment, the battery includes:
- an additional shunt line is provided for switching out all of a group of stacks of cells supplied by a particular one of the electrolyte stores, the additional being provided at an end of the group remote from an end to which the switch-out switch means is connected;
- an additional bypass switch means being provided in the additional shunt line; and
- an additional switch-out switch means is provided in series with the said switch-out means, remote from the group of stacks, the arrangement being that:
- the said shunt line is connected between the said switch-out switch means and the additional switch-out switch means and
- the additional switch means is connected to the remote side of the additional switch-out switch means;
- switch means for switching out the by-passed ones of the cells or stack(s) of cells from the series array, this switch-out switch means being normally closed; and
- a controller for actuating the switches in event of the measuring and comparing means detecting a difference above a threshold in state of charge in the respective stores, whereby during charging and/or discharging the state of difference can be reduced.

Preferably, the battery is a vanadium redox flow battery.

To help understanding of the invention, a specific embodiment thereof will now be described by way of example and with reference to the accompanying drawings, in which.

Figure 1:
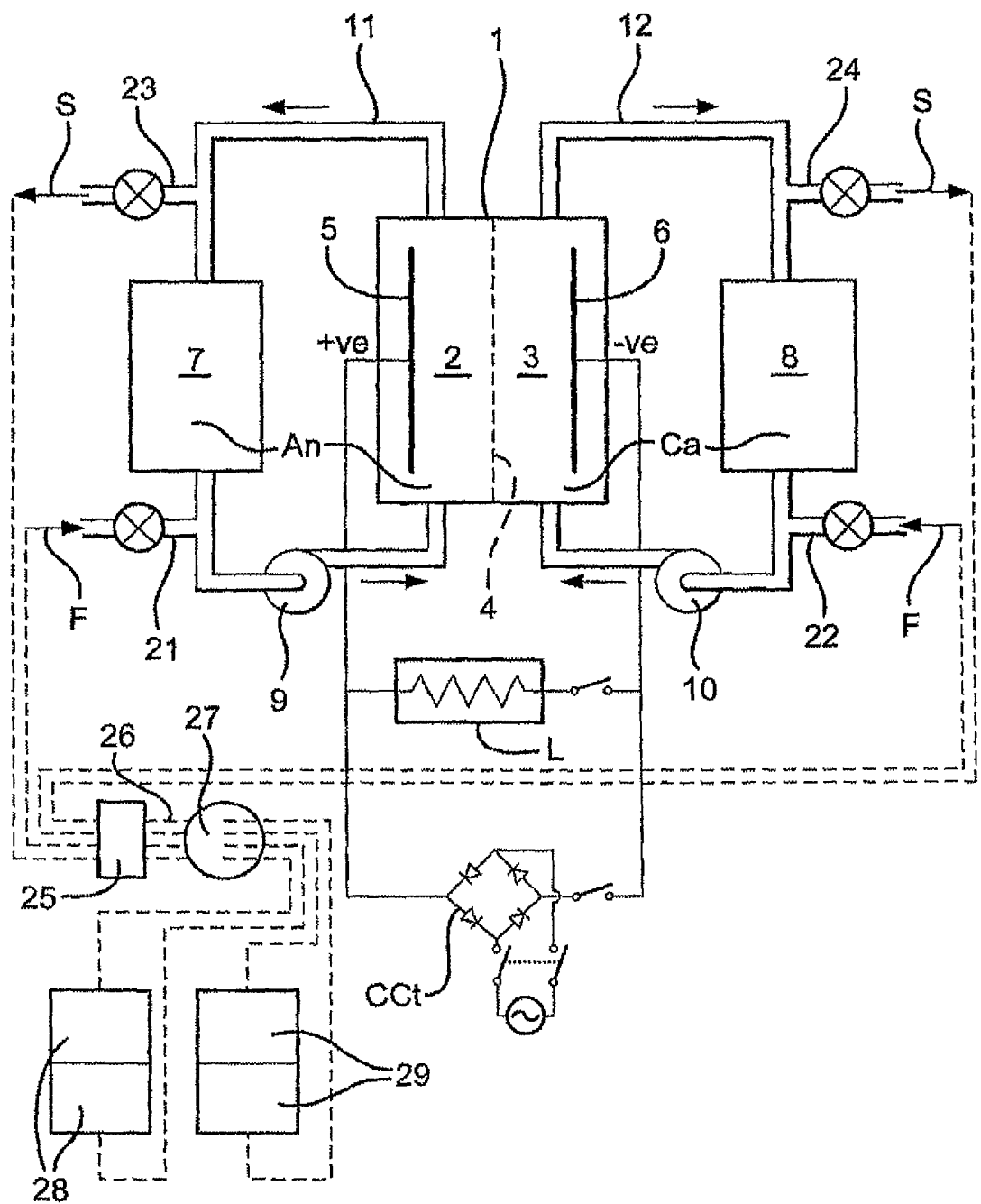
FIG. 1 is FIG. 1 of prior art WO0069692.
Figure 2:
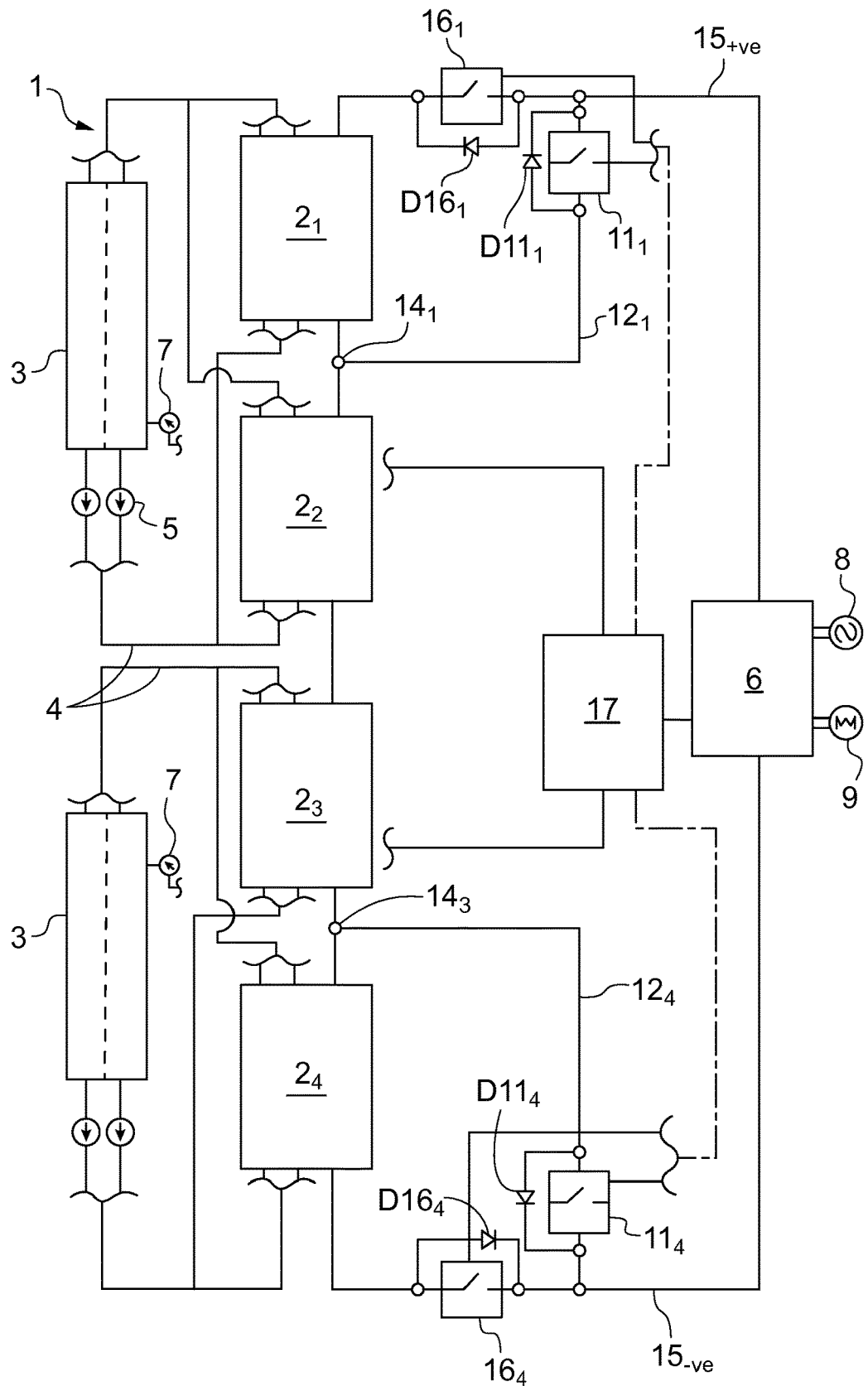
FIG. 2 is a block diagram of a flow battery in accordance with the invention.
Figure 3:
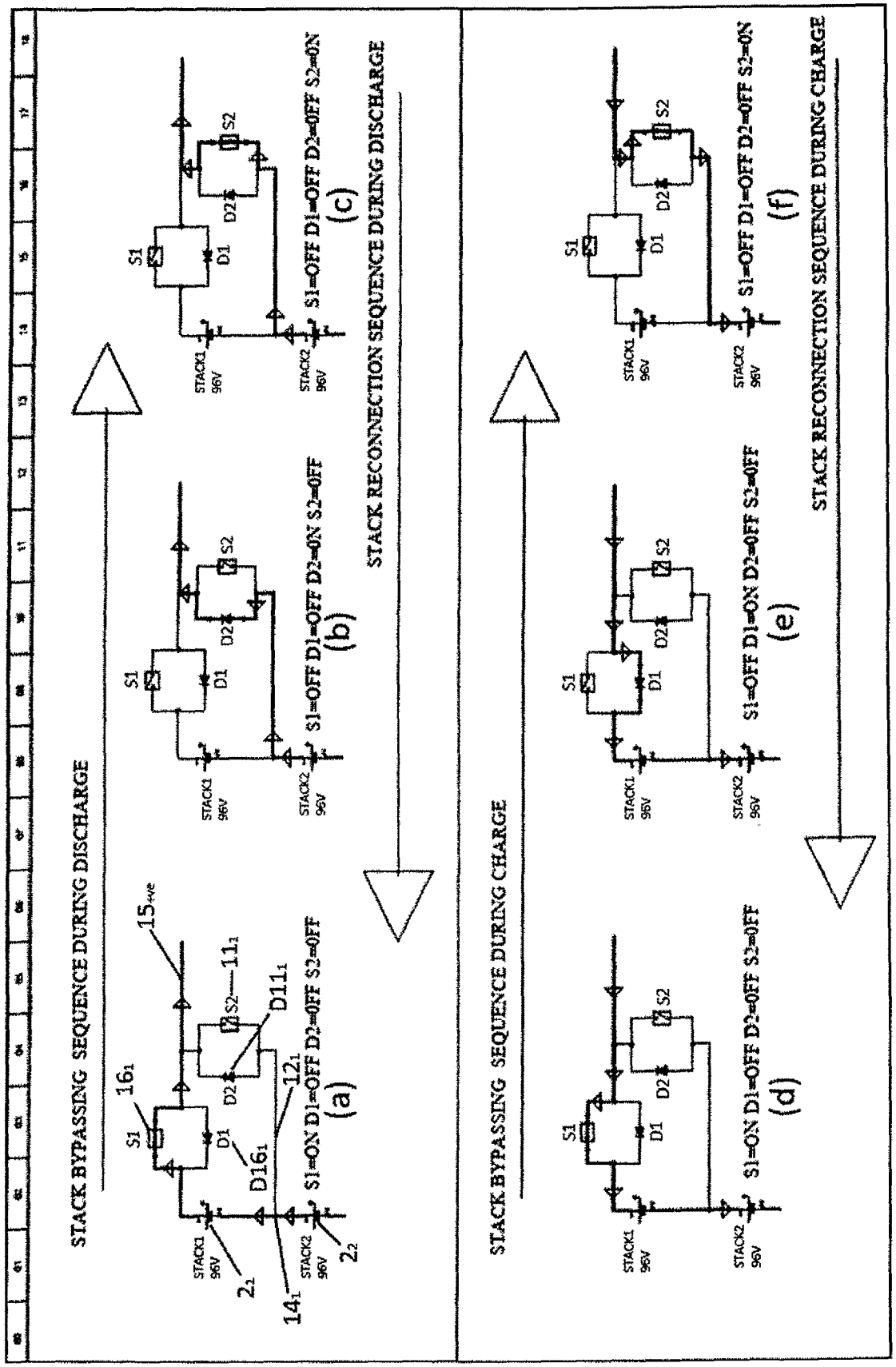
FIG. 3 is a more detailed diagram of switching-in and bypassing switches for the battery of FIG. 1, with six switch state diagrams (a)-(f)
Figure 4:
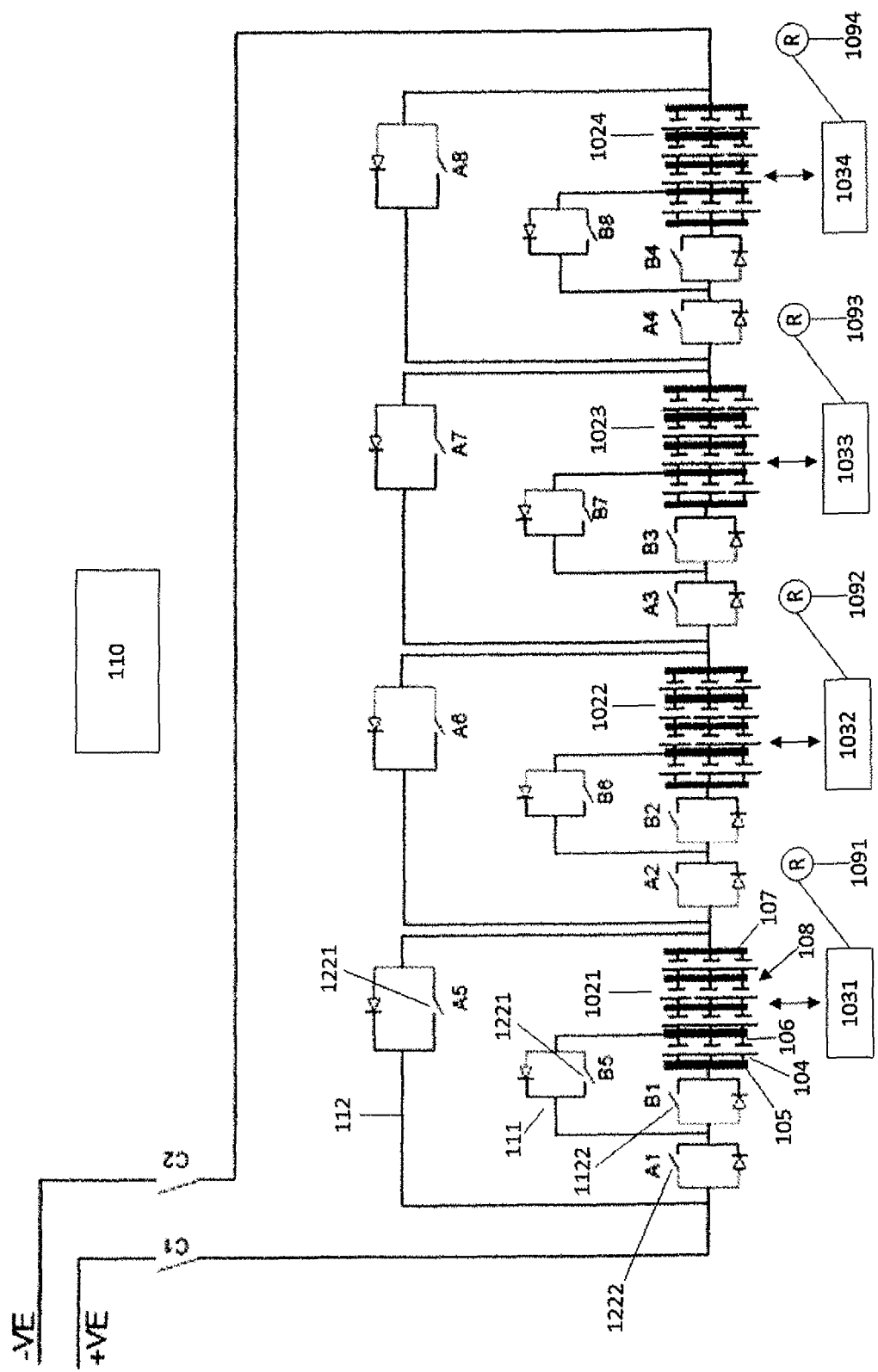
FIG. 4 is a block diagram of another battery in accordance with the invention.

Referring first to FIGS. 2 to 4 of the drawings, a flow battery 1 consists of a series of four Vanadium Redox stacks $2_1 \ldots 2_4$, normally electrically connected in series. The stacks are paired with electrolyte tanks 3. By paired is intended that each tank supplies in parallel two stacks via pipework 4, with electrolyte pumps 5. As shown, each tank is divided to have +ve & −ve compartments and respective pumps. This is conventional and will not be described further.

Each tank has a state of charge meter 7, conveniently in the form of a reference cell supplied with the tank's electrolytes.

The battery is connected to an inverter/charger 6 to receive charge from a source of electricity 8 and supply it to a load 9, as required.

In accordance with the invention, end ones of the stacks, i.e. stacks $2_1, 2_4$, each has across it a shunt or by-pass switch $11_1, 11_4$ in a shunt or by-pass line $12_1, 12_4$. Normally the shunt switches are open. The by-pass lines extend from the common points $14_1, 14_3$ of the stacks $2_1, 2_2$ & stacks $2_3, 2_4$ and to the +ve & −ve supply lines $15_{+ve}, 15_{-ve}$, to the inverter/charger 6. End parts of the +ve & −ve supply lines $15_{+ve}, 15_{-ve}$, have switching-out switches $16_1, 16_4$, between the respective +ve terminal of stack $2_1$ & the point of connection of the shunt line $12_1$ with the +ve supply line $15_{+ve}$ and the respective −ve terminal of stack $2_4$ & the point of connection of the shunt line $12_4$ with the −ve supply line $15_{-ve}$.

A controller 17 for the battery is connected to the switches $11_1, 11_4$ & $16_1, 16_4$ and the inverter charger 6 for all of their control. It is also connected to the state of charge meters 7. Should the controller detect a more-than 5% difference in the state of charge of the electrolytes for the respective stacks $2_1, 2_2$, & $2_3, 2_4$, it operates to switch out one of the stacks $2_1$ & $2_4$ according to which is more charged and whether the battery is being charged or is supplying electricity.

Whilst the switches could be switched simultaneously, as ganged together, this can result in a momentary short circuiting of one of the stacks or a momentary open circuit, which is liable to damage the inverter/charger or some apparatus or device connected to it. Accordingly the switches are provided with diodes D11, D16 to conduct as soon as opening of the other switch for the stack is opened and before the closure of the previously open switch.

The arrangement is shown in more detail in FIG. 3.

It will be appreciated that increasing the state of charge on the electrolytes of stacks $2_1, 2_2$ is equivalent to decreasing the state of charge on the electrolytes of stacks $2_3, 2_4$.

Further the arrangement of the switches (and their diodes) at the end ones of the stacks enables the state of charge of the electrolytes for both of the stacks connected to the respective tanks to be modified.

The controller monitors the state of charge of the electrolytes of the stacks. Where the state of charge of the electrolytes from different tanks exceeds a threshold, typically 5%, the controller alters the mode of charging or discharging via the inverter charger, (i.) to charge preferentially more heavily discharged electrolyte or (ii.) to discharge preferentially more heavily charged electrolyte. In practice when the threshold is reached, the mode change can be to either (i.) or (ii.). Where there are more stacks and in particularly more tanks, the electrolytes responsible for the threshold being exceeded are the logical ones to be dealt with in accordance with (i.) or (ii.). However it remains possible to operate with (i.) on one tank or (ii.) on the others for instance. It will normally be preferable to operate during charging, whereby the maximum rate of discharge remains available.

The detailed sequence of steps below is restricted to switching out and back in of one end stack during both discharging and charging.

The steps of bypassing stack $2_1$ during discharge are as follows for a detection of the electrolytes of stacks $2_1, 2_2$ being less charged by the 5% threshold than those of the stacks $2_3, 2_4$ (which is the same as the electrolytes of the stacks $2_3, 2_4$ being more charged):

1. Firstly as shown in FIG. 3(a), prior to bypassing the stack, the switch $11_1$ is open and the diode $D11_1$ is reverse biased; no current flows in the by-pass line $12_1$. The switch-out switch $16_1$ is closed and discharge includes from the stack $2_1$;
2. The switch-out switch $16_1$ is opened and with the diode $D16_1$ being reverse biased, current ceases to flow through and from the stack $2_1$. Simultaneously, the diode $D11_1$ becomes forward biased with removal the stack's voltage across it. It immediately starts conducting and without the switch $11_1$ being opened current flows in the line $12_1$;
3. Now, the switch $11_1$ is closed and current passes through it and not the diode $D11_1$. The result is that twice as much energy is drawn from the electrolytes of stacks $2_3,2_4$, not separately shown in FIGS. 3(a)-(b), as from that of stack $2_2$, whereby its less charged electrolyte drops in state of charge more slowly until it is aligned with that of stacks $2_3,2_4$;
4. The switch $11_1$ is now opened and the state of FIG. 3(b) is reverted to with current passing through diode $D11_1$;
5. Now the switch-out switch $16_1$ is closed and the situation of FIG. 3(a) is reverted to, with the difference that the electrolytes of the respective pairs of stacks are equally charged/discharged. They will remain so until another accumulation of tolerances and events causes the difference in state of charge threshold to be exceeded again and the same adjustment to be made again.

When the difference in state of charge threshold is detected during charging, a similar sequence of steps is gone through, except that the diode $D16_1$ conducts during the middle step.

The steps of bypassing stack $2_1$ during charging are as follows for a detection of the electrolytes of stacks $2_1,2_2$ being more charged by the 5% threshold than those of the stacks $2_3,2_4$ (which is the same as the electrolytes of the stacks $2_3,2_4$ being less charged):

11. Firstly as shown in FIG. 3(a), prior to bypassing the stack, as in step (1) above the switch $11_1$ is open and the diode $D11_1$ is reverse biased; no current flows in the by-pass line $12_1$. The switch-out switch $16_1$ is closed and discharge includes from the stack $2_1$;
12. The switch-out switch $16_1$ is opened, but in contrast to step (2) above and with the current flowing in the opposite direction, the diode $D16_1$ is forwards biased, and current continues to flow through the stack $2_1$. The diode $D11_1$ remains reverse biased and no current flows in the shunt line $12_1$;
13. Now, the switch $11_1$ is closed and current passes through it in the shunt line. The diode $D11_1$ becomes reverse biased and charging current ceases to flow in it and the stack $2_1$. The result is that twice as much energy passes into the electrolytes of stacks $2_3,2_4$, not separately shown in FIGS. 3(a)-(b), as that into the stack $2_2$, whereby its more charged electrolyte rises in state of charge more slowly until it is aligned with that of stacks $2_3,2_4$;
14. The switch $11_1$ is now opened and the state of FIG. 3(b) is reverted to with current passing through diode $D16_1$ and charging of stack $2_1$ resumes;
15. Now the switch-out switch $16_1$ is closed, charging of all the stacks continues and the situation of FIG. 3(a) is reverted to, with the difference that the electrolytes of the respective pairs of stacks are equally charged/discharged. They will remain so until the difference in state of charge threshold exceeded again and the same adjustment to be made again.

The switches, which could be transistor switches, are electro-mechanical relays.

Turning now to FIG. 4, a battery with many more stacks is shown together with the possibility of preferential charging/discharging of a variety of stacks. The basic circuitry for effecting this remains the same.

The battery has 48 stacks, but they are permanently connected in triplets, of stacks 102. These grouped in groups of twelve stacks, reference 1021, 1022, 1023, 1024. All the stacks in each group are supplied from common electrolyte stores 1031, 1032, 1033, 1034 respectively.

Within each group there are a triplet 104 of three stacks arranged in parallel between one end busbar 105 and a "quarter point" busbar 106. Another end busbar 107 is provided with a set 108 of nine stacks arrayed between it and the quarter point one as three parallel strings of three stacks in series. The voltage across the triplet, i.e. between the busbars 105,106, is of course one third of the voltage across the set of nine, i.e. between the busbars 106,107.

Representative ones of the cells in representative ones of the groups has a reference cell 1091,1092,1093,1094. These are all connected to a controller 110 for the battery.

Each group of stacks has an inner switch and diode circuit 111 for switching in or out its triplet of cells and an outer switch and diode circuit 112 for switching in or out the entire group of 12 cells. These will not be described in the same detail as the above described embodiment. Their diodes operate in an analogous manner to maintain continuity of current flow. The inner circuit switches 1121,1122 can be alternately opened and closed to bypass or reconnect the triplet of cells as required. The outer circuit switches 1221, 1222 likewise can switch in or out the entire group of cells. The former switching is likely to be for state of charge adjustment. The latter switching is likely to be infrequent and for eventualities such as electrolyte leakage or replacement.

The invention claimed is:

1. A method of balancing the state of charge of electrolytes in a battery having a plurality of flow battery stacks connected in series and supplied with electrolytes from at least two stores, the stacks each having a plurality of cells, the method comprising:
    measuring and comparing the state of charge of the electrolytes of the respective stores and registering if the states of charge differ by more than a state of charge difference threshold and in the case of a state of charge difference threshold being exceeded:
    controlling a number of the plurality of cells in the series connection of the stacks whereby less charged electrolytes discharge through fewer cells than more charged electrolytes, or
    controlling the number of the plurality of cells in the series connection of the stacks whereby less charged electrolytes are charged through more cells than more charged electrolytes, or a combination thereof.

2. The method as claimed in claim 1, wherein the number of the plurality of cells in the series connection of the stacks is controlled by making connection to an intermediate electrode within a stack and leaving a number of the plurality of the cells in the stack unconnected.

3. The method as claimed in claim 1, wherein the number of the plurality of cells in the series connection of the stacks is controlled by switching one or more entire stacks in or out of the series of stacks.

4. The method as claimed in claim 1, wherein the number of the plurality of cells in the series connection of the stacks is controlled by switching out of series cells or one or more entire stacks, wherein:
when discharging, the less charged electrolyte is supplied to a reduced number of cells and
when charging, the more charged electrolyte is supplied to a reduced number of cells.

5. The method as claimed in claim 1, the battery including at least one pair of switches, a normally open bypass switch for bypassing a certain number of cells and another normally closed switching out switch for switching the bypassed cells out of the series connection of stacks, the method including simultaneous switching of the bypass switch and switching-out switch.

6. The method as claimed in claim 1, the battery including at least one pair of switches, a normally open bypass switch for bypassing a certain number of cells and another normally closed switching out switch for switching the bypassed cells out of the series connection of stacks, the method including sequential switching between the bypass switch and the switching out switch.

7. The method as claimed in claim 6, the battery including unidirectional conduction elements connected in parallel with the at least one pair of switches, the method including passing current through one of the unidirectional elements for continuity of current flow on switching of a first operated switch of the at least one pair of switches during the sequential switching, when both the bypass switch and the switching out switch are open.

8. A flow battery comprising:
a series array of at least two stacks of cells having at least two respective electrolyte stores;
means for measuring and comparing the state of charge of the electrolytes in the respective stores;
a by-pass switch for switching a bypass shunt into the series array in place of at least some by-passed ones of the cells or stack(s) of cells, this by-pass switch being normally open;
a switch-out switch for switching out the by-passed ones of the cells or stack(s) of cells from the series array, this switch-out switch being normally closed; and
a controller for actuating the by-pass switch or switches and the switch-out switch in event of the measuring and comparing means detecting a difference above a threshold in state of charge in the respective stores, whereby during charging and/or discharging a state of difference can be reduced.

9. The flow battery as claimed in claim 8, wherein the switch-out switch is connected to the by-passed cells at one end of their series connection together.

10. The flow battery as claimed in claim 8, wherein the by-pass switch and the switch-out switch are transistor switches.

11. The flow battery as claimed in claim 8, wherein the by-pass switch and the switch-out switch are electromagnetic relays.

12. The flow battery as claimed in claim 8, including a shunt line in which the by-pass switch or switches is connected, the shunt line being across the by-passed ones of the cells or stack(s) of cells.

13. The flow battery as claimed in claim 12, wherein the shunt line is connected to an intermediate terminal in a stack of cells for bypassing a number of cells of the stack having the intermediate terminal.

14. The flow battery as claimed in claim 12, wherein the shunt line is connected between two stacks for bypassing an entire stack of cells within a series of stacks fed by a particular one of the electrolyte stores.

15. The flow battery as claimed in claim 14, including:
an additional shunt line provided for switching out all of a group of stacks of cells supplied by a particular one of the electrolyte stores, the additional shunt line being provided at an end of the group remote from an end to which the switch-out switch is connected;
an additional by-pass switch being provided in the additional shunt line; and
an additional switch-out switch provided in series with the switch-out switch, remote from the group of stacks, the arrangement being that:
the shunt line is connected between the switch-out switch and
the additional switch-out switch and
the additional by-pass switch is connected to a remote side of the additional switch-out switch.

16. The flow battery as claimed in claim 12, wherein the unidirectional conduction elements are diodes.

17. The flow battery as claimed in claim 8, including unidirectional conduction elements connected in parallel with the switch-out switch and the by-pass switch, and the additional switches where provided, whereby current can pass through one of the unidirectional elements for continuity of current flow on switching of a first operated of the switches during the sequential switching, when both the switch-out switch and the by-pass switch, or both the additional switches are open.

18. The flow battery as claimed in claim 8, wherein the measuring and comparing means comprises at least one reference cell for each stack or group of stacks supplied from a common electrolyte store.

19. The flow battery as claimed in claim 8, wherein the array comprises further stacks connected in parallel with the said series connected stacks, with connections between the parallel connected stacks at points of series connection thereof.

20. The flow battery as claimed in claim 8, wherein the battery is a vanadium redox flow battery.

* * * * *